United States Patent [19]

Stuhler et al.

[11] Patent Number: 5,031,189
[45] Date of Patent: Jul. 9, 1991

[54] LASER RESONATOR

[75] Inventors: Helmut Stuhler, Röthenbach; Martin März, Amberg, both of Fed. Rep. of Germany

[73] Assignee: Hoechst CeramTec Aktiengesellschaft, Selb, Fed. Rep. of Germany

[21] Appl. No.: 452,507

[22] Filed: Dec. 19, 1989

[30] Foreign Application Priority Data

Dec. 21, 1988 [DE] Fed. Rep. of Germany ....... 3843015

[51] Int. Cl.$^5$ .............................................. H01S 3/08
[52] U.S. Cl. ..................................... 372/92; 372/107; 372/33; 372/34; 372/65
[58] Field of Search ................... 372/61, 107, 103, 34, 372/65, 33, 92

[56] References Cited

U.S. PATENT DOCUMENTS

| | | | |
|---|---|---|---|
| 4,464,763 | 8/1984 | Mohler | 372/107 |
| 4,479,225 | 10/1984 | Mohler et al. | 372/107 |
| 4,679,201 | 7/1987 | Klingel | 372/61 |
| 4,803,697 | 2/1989 | Chaffee | 372/107 |
| 4,897,851 | 1/1990 | Vecht et al. | 372/107 |

Primary Examiner—Léon Scott, Jr.
Attorney, Agent, or Firm—Foley & Lardner

[57] ABSTRACT

The stability of the frequency and/or the efficiency of a laser ultimately depends on the constancy of the resonator length. To ensure this demand the resonator elements are mounted on holders supported by longitudinal stabilizer bars, with the holders and bars being made of ceramic material.

13 Claims, 1 Drawing Sheet

U.S. Patent   July 9, 1991   5,031,189
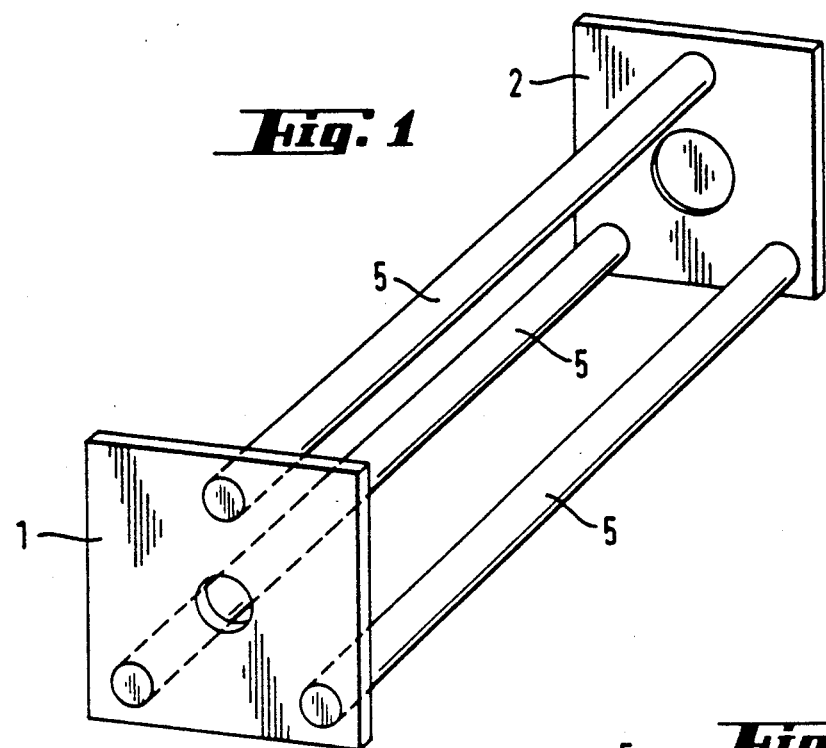
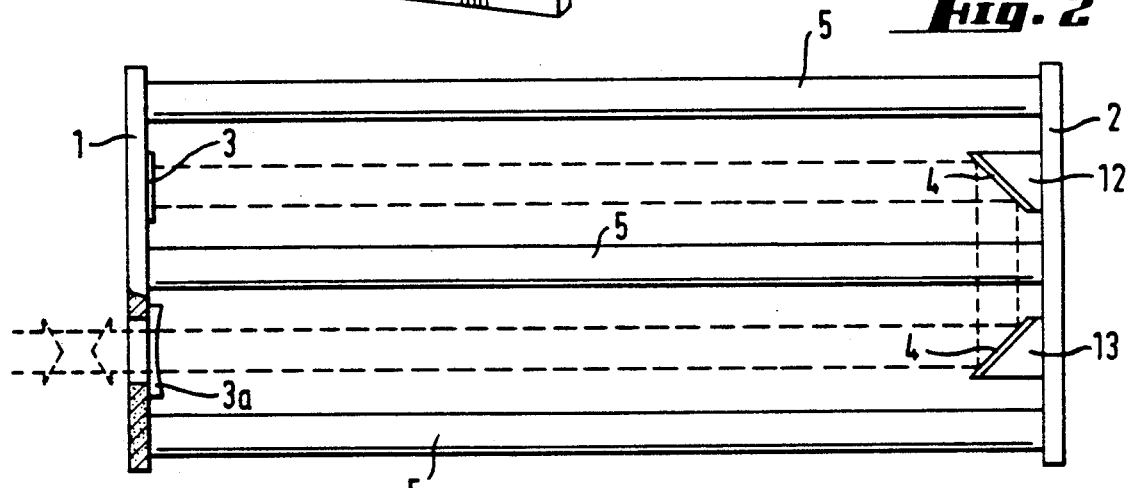
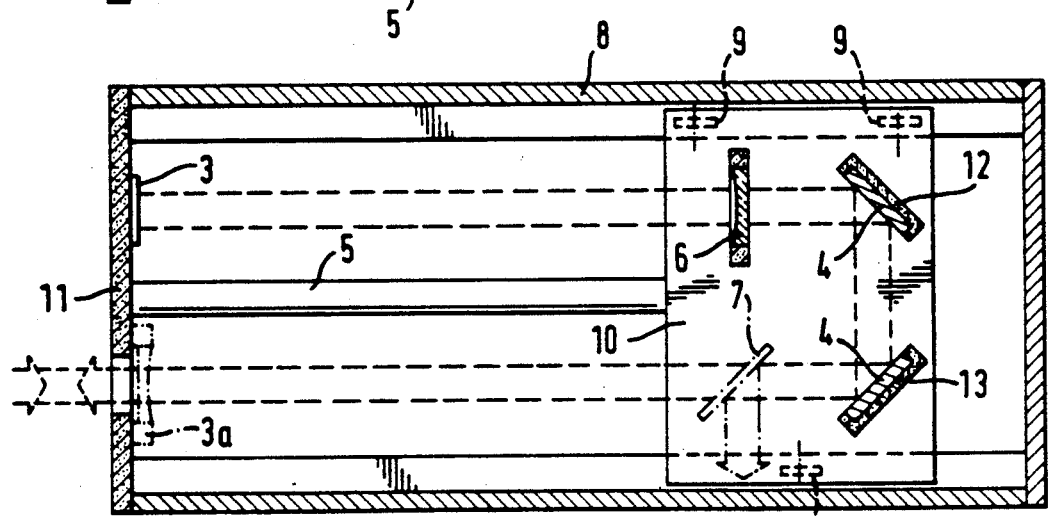

LASER RESONATOR

BACKGROUND OF THE INVENTION

This invention relates to a laser resonator in which the resonator elements are arranged on stabilizers.

The frequency and/or power stability of lasers critically depends on the extent to which the resonator length can be kept stable with respect to external influences and primarily with respect to temperature fluctuations. In the case of the carrier materials (steel, invar) hitherto used for the resonator elements (mirrors, prisms, etc.), a considerable amount of control is required for compensating for temperature-related thermal expansion. This invention is intended to provide a remedy in this respect.

SUMMARY OF THE INVENTION

The invention achieves the object of compensating for temperature related expansion by means of a laser resonator in which the resonator elements are arranged on stabilizers of ceramic material.

The resonator elements can be mounted on transverse and longitudinal stabilizers of ceramic material or on holders of ceramic material which, in turn, are arranged on the transverse and/or longitudinal stabilizers.

In particular, the invention is suitable for constructing lasers which are used in radar engineering, instrumentation (for example spectroscopy) or for pumping far-infrared lasers, that is to say for lasers in which a high frequency and power stability are required. The low weight and the high stability with respect to temperature fluctuations are particularly advantageous in the case of airborne laser systems, for example for pollution measurements.

BRIEF DESCRIPTION OF THE DRAWINGS

The laser resonators are shown in illustrative embodiments in the figures, in which FIG. 1 diagrammatically shows a longitudinally stabilized stretched laser resonator construction without resonators, FIG. 2 shows a longitudinally stabilized folded laser resonator, and FIG. 3 shows a longitudinally and transversely stabilized folded laser resonator arranged in a housing.

DESCRIPTION OF THE PREFERRED EMBODIMENTS

The resonator elements (3,3a), for example prisms, mirrors and/or semitransparent mirrors are mounted on holders (1,2) and the holders (1,2) are connected by rods (5). The holders and rods consist of ceramic material. In the case of the folded resonator (FIG. 2), the beams are deflected by deflecting mirrors (4) which are fixed by ceramic holders (12, 13) to holder (2). The holders (1,2) are connected by rods (5). The folded resonator according to FIG. 3 is arranged in a housing (8). The resonators (3,3a) are mounted on the housing front wall (11). Rod (5) connects the housing front wall (11) to plate (10) on which the deflecting mirrors (4) fixed on holders (12, 13) and optional output mirror (6) and beam splitter (7) are arranged. Plate (10) slides on roller bearings (9) which enables the resonator to be decoupled from the housing. In FIG. 2, the holders (1,2) and in FIG. 3 the plate (10) also fulfill the function of a transverse stabilizer. The mirrors (3a) can be constructed as output mirrors. The dashed lines in each case indicate the beam path.

We hereby claim:

1. A laser resonator structure, comprising:
    a laser resonator including laser resonator elements for transmitting a laser light beam;
    a structural stabilizer of a ceramic material having a low coefficient of thermal expansion; and
    holder means for mounting said laser resonator elements on said structural stabilizer to compensate for temperature-related thermal expansion, thereby producing a laser having high frequency stability and high power stability.

2. A structure as in claim 1, wherein said holder means comprises a ceramic material having a low coefficient of thermal expansion.

3. A structure as in claim 2, wherein
    said ceramic material is selected from a group consisting of condierite, condierite-mullite compounds, germanium modified condierite, aluminum titanate, aluminum silicate ceramic and lithium aluminum silicate ceramic.

4. A structure as in claim 1, wherein
    said ceramic material is selected from a group consisting of condierite, condierite-mullite compounds, germanium modified condierite, aluminum titanate, aluminum silicate ceramic and lithium aluminum silicate ceramic.

5. A structure as in claim 1, wherein
    said structural stabilizer is a longitudinal stabilizer.

6. A structure as in claim 2, wherein said holder means comprises a transverse stabilizer.

7. A structure as in claim 5, wherein said holder means comprises a transverse stabilizer and holding means for mounting at least one of said laser resonator elements on said transverse stabilizer.

8. A structure as in claim 1, wherein said structural stabilizer is a transverse stabilizer.

9. A structure as in claim 1, wherein
    said laser resonator elements transmit said laser light beam by light reflection.

10. A structure as in claim 1, wherein
    said laser resonator elements transmit said laser light beam by light conduction.

11. A structure as in claim 1, wherein
    said laser resonator elements transmit said laser light beam by light conduction and by light reflection.

12. A laser resonator structure, comprising:
    a plurality of transverse stabilizers;
    a plurality of longitudinal stabilizers mounted between adjacent ones of said transverse stabilizers;
    a laser resonator including a plurality of laser resonator elements; and
    means for mounting said laser resonator elements in a laser light beam alignment path on a surface of said transverse stabilizers;
    said longitudinal stabilizers and said transverse stabilizers comprising a ceramic material having a low coefficient of thermal expansion to compensate for temperature-related thermal expansion, thereby producing a laser having high frequency stability and high power stability.

13. A structure as in claim 12, wherein said means for mounting is of a ceramic material having a low coefficient of thermal expansion.

* * * * *